(12) United States Patent
Hsueh et al.

(10) Patent No.: US 9,525,750 B2
(45) Date of Patent: Dec. 20, 2016

(54) METHOD OF COLLECTING INFORMATION ABOUT TEST DEVICES IN A NETWORK

(71) Applicant: Viavi Solutions Inc., Milpitas, CA (US)

(72) Inventors: Canning Hsueh, Colorado Springs, CO (US); Samuel M. Bauer, Colorado Springs, CO (US); Michael Stevens, Fountain, CO (US); John P. Mcintire, Colorago Springs, CO (US)

(73) Assignee: Viavi Solutions Inc., Milpitas, CA (US)

( * ) Notice: Subject to any disclaimer, the term of this patent is extended or adjusted under 35 U.S.C. 154(b) by 171 days.

(21) Appl. No.: 14/180,111

(22) Filed: Feb. 13, 2014

(65) Prior Publication Data

US 2014/0229615 A1 Aug. 14, 2014

Related U.S. Application Data (60) Provisional application No. 61/764,372, filed on Feb. 13, 2013.

(51) Int. Cl.
| | |
|---|---|
| *H04L 29/08* | (2006.01) |
| *H04L 29/12* | (2006.01) |
| *H04L 12/24* | (2006.01) |
| *G06F 15/173* | (2006.01) |

(52) U.S. Cl.
CPC .......... *H04L 67/2842* (2013.01); *H04L 67/16* (2013.01); *H04L 41/0213* (2013.01); *H04L 61/35* (2013.01)

(58) Field of Classification Search
CPC ...... H04L 67/12; H04L 67/2842; H04L 67/16; H04L 61/35; H04L 41/0213

USPC .......... 709/224, 226; 370/255, 389
See application file for complete search history.

(56) References Cited

U.S. PATENT DOCUMENTS

| | | | |
|---|---|---|---|
| 5,185,860 A * | 2/1993 | Wu | H04L 41/0213 709/224 |
| 6,574,664 B1 * | 6/2003 | Liu | H04L 29/12009 709/224 |
| 7,336,673 B2 | 2/2008 | Ilnicki et al. | 370/412 |
| 7,573,914 B2 | 8/2009 | Ilnicki et al. | 370/519 |
| 7,675,861 B2 * | 3/2010 | Metzger | H04L 45/04 370/241 |
| 7,689,854 B2 | 3/2010 | Ilnicki et al. | 713/400 |
| 7,760,663 B2 | 7/2010 | Ilnicki et al. | 370/254 |
| 7,769,850 B2 * | 8/2010 | Silverman | H04L 41/145 370/252 |
| 7,894,356 B2 | 2/2011 | Mottishaw et al. | 370/252 |
| 7,948,974 B2 | 5/2011 | Ilnicki et al. | 370/366 |
| 8,009,557 B2 | 8/2011 | Curran-Gray et al. | 370/229 |
| 8,654,790 B2 | 2/2014 | Haver et al. | 370/474 |

(Continued)

*Primary Examiner* — David Lazaro
*Assistant Examiner* — Zi Ye
(74) *Attorney, Agent, or Firm* — Harrity & Harrity, LLP (57) ABSTRACT

A method of collecting information about a plurality of test devices connected in a network is provided. The method includes: identifying routable network addresses within a plurality of the network addresses, and sending discovery packets to the plurality of routable network addresses, receiving responses from the test devices, obtaining the information about the test devices, and storing the information so as to associate, for each of the test devices, the test-device information with at least one of the routable network addresses. The routable network addresses are stored in non-volatile memory for repeated use in re-discovery of the test devices in the network.

20 Claims, 7 Drawing Sheets

(56) References Cited

U.S. PATENT DOCUMENTS

| | | | |
|---|---|---|---|
| 8,661,292 B2* | 2/2014 | Stevens | H04L 12/2697 709/224 |
| 2002/0039357 A1* | 4/2002 | Lipasti | H04L 29/12009 370/338 |
| 2004/0221041 A1* | 11/2004 | Tabbara | H04L 69/40 709/227 |
| 2007/0097991 A1* | 5/2007 | Tatman | H04L 12/4641 370/395.53 |
| 2009/0052332 A1* | 2/2009 | Fukuyama | H04L 41/06 370/242 |
| 2011/0283140 A1* | 11/2011 | Stevens | H04L 12/2697 714/27 |
| 2011/0305149 A1* | 12/2011 | Scott | H04L 12/2697 370/252 |
| 2012/0033663 A1* | 2/2012 | Guichard | H04L 45/02 370/389 |
| 2013/0148547 A1* | 6/2013 | Page | H04L 67/12 370/255 |
| 2013/0268652 A1* | 10/2013 | Hugard, IV | H04W 4/008 709/224 |
| 2014/0226457 A1 | 8/2014 | Hsueh et al. | |
| 2015/0058479 A1* | 2/2015 | Kolhi | H04L 43/0811 709/224 |

\* cited by examiner

METHOD OF COLLECTING INFORMATION ABOUT TEST DEVICES IN A NETWORK

CROSS-REFERENCE TO RELATED APPLICATIONS

The present application claims priority from U.S. Provisional Patent Application No. 61/764,372 filed Feb. 13, 2013, incorporated herein by reference for all purposes.

TECHNICAL FIELD

The present invention relates generally to networking and communications technology and, more particularly, to remotely monitoring traffic in a network.

BACKGROUND OF THE INVENTION

Communication networks are widely used today; the variety of networks includes the Internet, wide-area networks (WANs), local-area networks (LANs), telephony networks, and wireless networks. The importance of network monitoring and testing is growing as well as the requirements for the related methods and equipment.

Monitoring devices may be implemented within the network for monitoring communication along such network. Such monitoring devices are referred to as "eavesdropping devices" or "passive probes;" they are generally not a party to the communication but instead are monitoring such communication, e.g. for performance monitoring, testing, or other reasons. The elements that constitute the network may also act as eavesdropping devices because they may take traffic traveling through the device and replicate it on another egress port for use by monitoring or testing devices.

A test device for analyzing traffic packets may be attached directly to a monitor port or passive network tap at a switch or element.

Conventionally, a device in a network requires an IP address to communicate with it over an IP routed network. If a device doesn't have an IP address, it can only be communicated with on the local subnet by utilizing MAC level protocols. Some devices, like intelligent network taps, passively tap a network to provide access to the packets and therefore require an IP address and often a separate management network connection. There are disadvantages to having IP addresses on large numbers of devices and separate management networks due to cost and scalability. In order to minimize the total number of IP addresses required on a network, certain devices such as test devices may be not assigned a unique IP address.

Once installed and properly configured, a system of such test devices may be successfully controlled by a control device. However, the initial deployment of the system presents a challenge of mapping test devices relative to the communication network wherein the test devices are installed; especially if information about the underlying network is not sufficient and also needs to be discovered. For a handful of test devices, a technician can provide information e.g. though a command line. Monitoring of large networks requires a large number of test devices, and discovering multiple, possibly unaddressed devices and mapping such a test system relatively to the network being monitored, is more difficult.

Collecting information about test devices and their positions in the network may be complicated by the presence of aggregated link groups (LAG) within the network. The network may include LAG devices from a variety of vendors. In addition, different customers may configure their LAGs differently. By way of example, various parameters such as source/destination IP addresses or virtual local area network (VLAN) IDs may be used as hash keys for load balancing. Additionally, parts of the network may perform load rebalancing, which further complicates collection of information about the test devices, as well as communication between the central control device and the test devices. The dynamic load balancing may result in that some test devices may be "lost" and rediscovery may be required.

It would therefore be useful to provide an improved method of collecting information about test devices connected in a network.

SUMMARY OF THE INVENTION

A method of collecting information about a plurality of test devices connected in a network is provided. The network has a plurality of nodes each having a network address within a plurality of network addresses. The method includes: (1) by a control device, identifying a plurality of routable network addresses within the plurality of the network addresses, comprising: sending first packets to the plurality of network addresses, wherein a frequency of sending the first packets is below a predefined threshold; and, receiving responses to the first packets from one or more of the plurality of network addresses, thereby identifying the plurality of routable network addresses; (2) by the control device, obtaining the information about the plurality of test devices, comprising: sending discovery packets, wherein the plurality of routable network addresses are used as destination addresses in the discovery packets; receiving information packets from the plurality of test devices; and, extracting the information about the plurality of test devices from the information packets, comprising extracting, from each of the information packets, test-device information about one of the plurality of test devices; and, (3) storing the information about the plurality of test devices in memory so as to associate, for each of the plurality of test devices, the test-device information with at least one of the plurality of routable network addresses.

Another aspect of the present invention provides a method of collecting information about a plurality of test devices connected in a network, wherein a plurality of routable network addresses is identified and stored in non-volatile memory for repeated use in re-discovery of test devices in the network.

Yet another aspect of the invention provides recursively identifying routable network addresses, using them for discovery of test devices in the network, collecting network addresses from packets passing through the discovered test devices, and using the collected network addresses so as to identify additional routable network addresses, etc.

An apparatus comprises one or more processors and a memory coupled to the one or more processors comprising instructions executable by the processors, the processors operable when executing the instructions to perform the method of collecting information about a plurality of test devices connected in a network.

BRIEF DESCRIPTION OF THE DRAWINGS

The invention will be described in greater detail with reference to the accompanying drawings which represent preferred embodiments thereof, wherein.

DETAILED DESCRIPTION OF EXEMPLARY EMBODIMENTS

Figure 1:
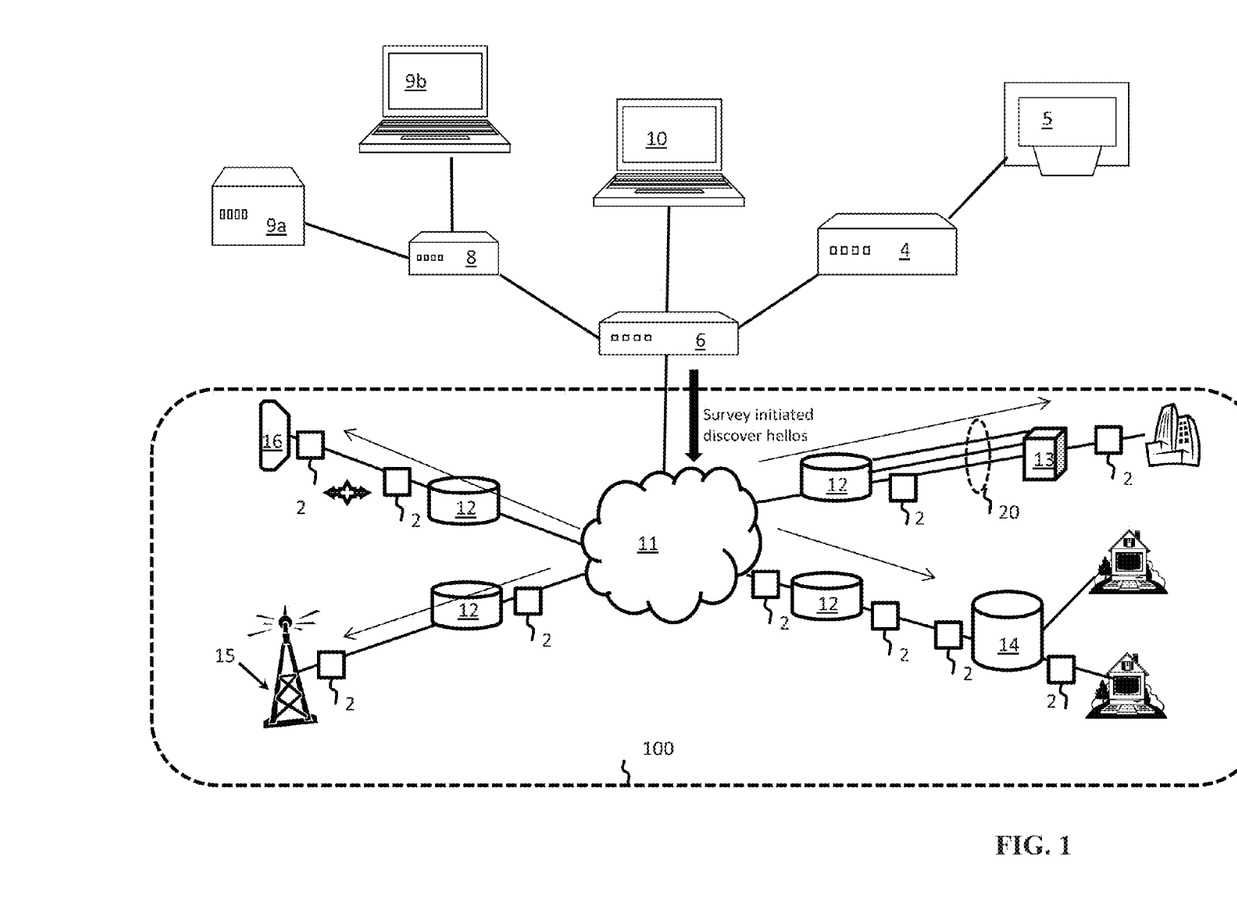
FIG. 1 is a schematic diagram of a network test system for monitoring traffic in a network.

A plurality of test devices may be connected inline within a network which includes multiple nodes each having an IP address within a plurality of IP addresses. With reference to FIG. 1, a communication network 100 includes multiple nodes each having an IP address within a plurality of IP addresses. By way of example, the network 100 includes devices 12, switches 13, routers 14, data receivers and transmitters 15, and other access equipment 16, e.g. Digital Subscriber Line Access Multiplexers (DSLAMs), Broadband Remote Access Servers (BRASs), Cable Modem Termination System (CMTSs), Optical Line Terminals (OLTs), etc. Multiple physical links connecting two nodes may be bundled into a Link Aggregation Group (LAG), as illustrated by a LAG 20.

A network monitoring system includes a plurality of test devices 2 installed for monitoring packet traffic in the packet network 100, and a control device 6 for controlling the test devices 2. The test devices 2 are connected inline within the network 100 and enable network operators and managers to access packets and data at any point in the network 100 where the test devices 2 are employed. In operation, the test devices 2 selectively copy and forward packets to a target application.

The test devices 2 may be located in various locations connected to a core IP network 11, such as nodes 12, switches 13, routers 14, data receivers and transmitters 15, and any other access equipment 16, e.g. DSLAM, CMTS, OLT etc. If multiple physical links are bundled into a LAG such as the LAG 20, which can also happen between any two switches 13, routers 14 and other devices, test devices 2 may be installed in each of the bundled physical links inside the LAG.

The control device 6 may be used for controlling multiple test devices 2 connected within the network 100 which may be defined by a plurality of IP addresses, e.g. a subnet identified by a mask and thus by a range of addresses. Alternatively, the network 100 may be a Virtual Private Network (VPN), wherein the plurality of IP addresses may be defined by explicitly listing the addresses. The network 100 may be a VPN or VLAN. The method will also work in networks using a variety of other protocols like Generic Route Encapsulation (GRE) or Multi-label Packet Switching (MPLS), such that the network can be virtually segmented to cause IP address routing paths in the network.

The test devices 2 may be unaddressed devices. More precisely, an "unaddressed" device may have or have not a network address. However, the method disclosed therein makes no use of addresses of test devices, treating them effectively as "unaddressed" devices. Communication with an unaddressed test device relies on inspection of packets passing through the test device and comparing the content of the packets as disclosed.

Figure 2:
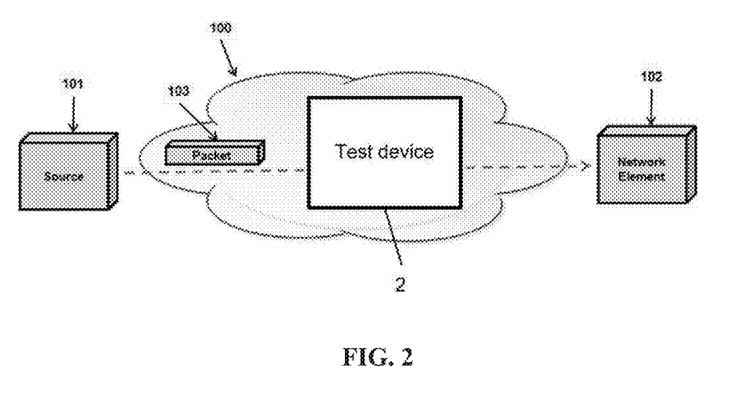
FIG. 2 is a schematic diagram of a test device connected inline in a network.

With reference to FIG. 2, a test device 2 is connected inline in a network 100 so that packets passing between at least two devices on the network, in this case between a data source device 101 and a destination device 102, pass through the test device 2. The test device 2 implements a method of network testing which may include passive monitoring, active testing, or a combination of both, as well as testing a subnetwork, link, or a device. In the example of FIG. 2, the packet 103 travels from the source 101 to the destination 102 and is intercepted by the test device (or "probe") 2. The protocol-generic test device 2 may recognize packet 103 as a special test/configuration packet by scanning for and finding a predetermined pattern embedded in the packet's payload. In particular, the control device 6 may form the packet 103 and insert a predefined "hello" pattern into the IP payload field of the packet 103, and the test device 2 would recognize the discovery packet and respond to the control device 6.

If the packet 103 is not intended to the test device 2, i.e. the packet 103 includes none of the authentication patterns stored in the device 2, the packet 103 is forwarded to the destination address of the packet without any change to the packet 103. However, the test device 2 may collect the destination address and/or the source address from the packet 103 and add the collected network address(es) to the set of collected network addresses. The collected network addresses, or at least some of them, are to be provided to the control device 6. Generally speaking, the test device 2 forwards all packets to their destinations, with the exception of the packets intended to the test device 2. In other words, the packets which include none of the predetermined identification patterns should be forwarded without any changes.

When the test devices 2 are installed within the network 100, the control device 6 has no information about the locations of the test devices 2, where in the network 100 the test devices are connected. Considering that, in practice, the number of test devices is greater than 10, and often greater than 100, it is likely that the control device 6 has no information at all which probes are installed in the network 100.

One possible way to discover the probes 2 would be sending discovery packets with the predefined "hello" pattern to all the IP addresses e.g. in a subnet address range. However, large networks in general employ LAGs and load balancing so that some of the "discovered" probes 2 may be lost and re-discovery may be often necessary which would affect the network performance.

An improved discovery method relies on the observation that, in general, not all the IP addresses associated with the network 100 are routable, i.e. may be reached from the control device 6. Some IP addresses may be not assigned, other addresses may be not routable e.g. because the corresponding nodes are switched off. Thus, the discovery of the test devices may include identifying routable IP addresses within the plurality of IP addresses which define the network 100.

Figure 3:
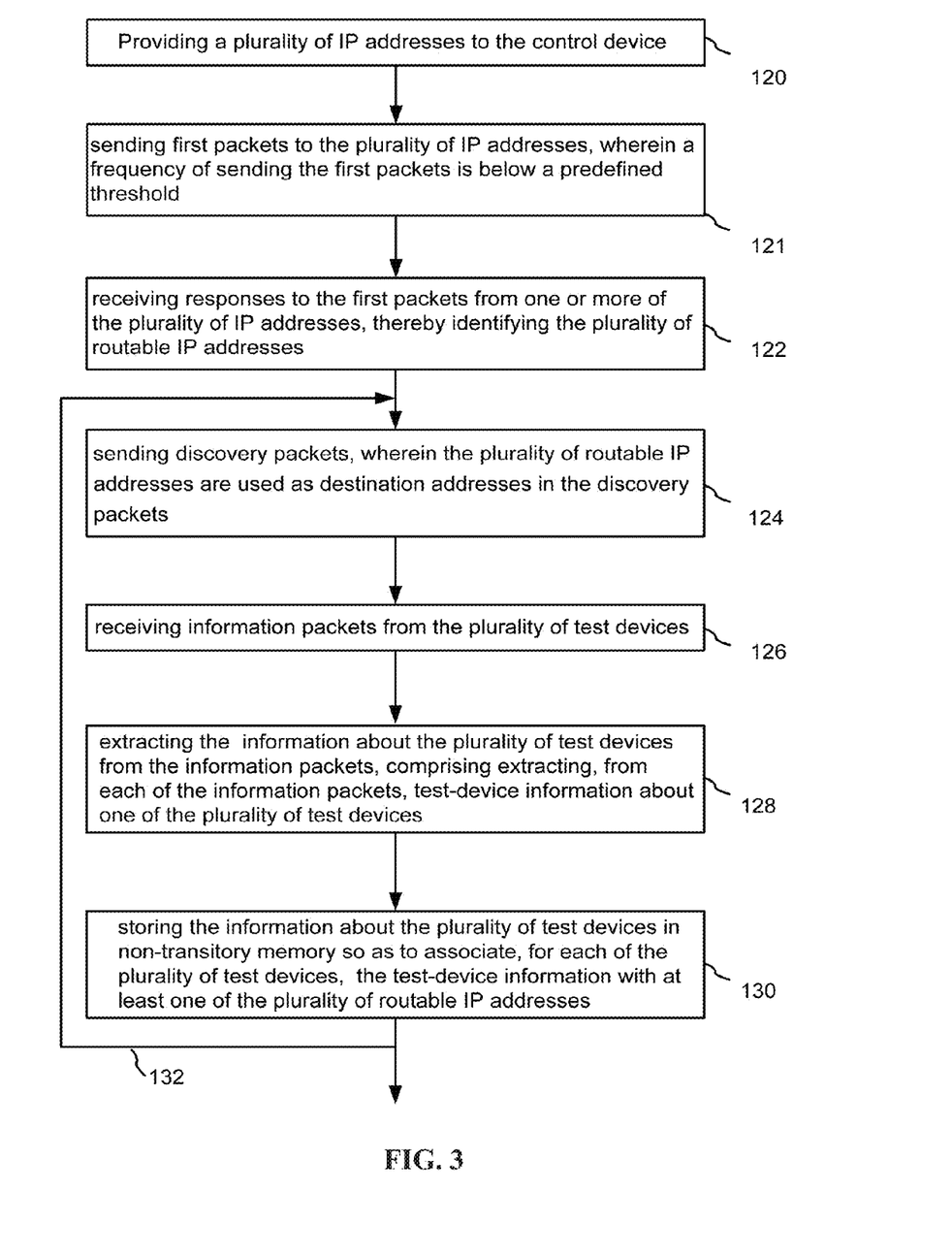
FIG. 3 is a flow chart of a method of collecting information about a plurality of test devices within a network.

FIG. 3 is a flow chart of a method of collecting information about a plurality of test devices connected in a network comprising a plurality of nodes each having an IP address within a plurality of IP addresses. The method includes receiving the plurality of IP addresses at the control device with in a network identifying step 120, which also may be referred to as a step of providing IP addresses. The customer may provide a predetermined list of IP addresses in the form of an address list or range. The list/range may be obtained by programmatic query of customer device on the network that manage the IP address pools in use on the network, or they could be manually typed in or input from a text file. Additionally, once a probe 2 is discovered from the control device 6, the probe 2 may send back collected IP addresses or traffic samples for the control device 6 to learn about IP addresses in use on the network.

In a request sending step 121, the control device 6 identifies a plurality of routable IP addresses within the plurality of the IP addresses, which includes sending first packets to the plurality of IP addresses, and receiving responses to at least some of the first packets from some of the IP addresses in a response receiving step 122. The first packets may be Internet Control Message Protocol (ICMP) echo request packets, also known as "ping" messages, from the control device 6 to substantially all IP addresses in the network 100. Instead of ICMP, any other network protocol that can elicit responses from devices on the network, e.g. Internet Group Management Protocol (IGMP), Interior Gateway Routing Protocol (IGRP), Enhanced Interior Gateway Routing Protocol (EIGRP), ICMP Internet Router Discovery Protocol (IRDP), IRDPv6, Link Layer Discovery Protocol (LLDP), Cisco Discovery Protocol (CDP), Link Aggregation Control Protocol (LACP), Port Aggregation Protocol (PAgP), and ICMP traceroute.

Ideally, all the addresses in the plurality of IP addresses known to be within the network 100 should be tested whether they can be reached (routable) from the test control device 6 and first packets should be sent to all the IP addresses known at the control device 6 as being within the network 100. However, in operation, few IP addresses within the plurality may be left not tested for routability. Nevertheless, substantially all the addresses from the plurality identified to the test control device 6 should be tested. In other words, first packets should be sent to at least P % of the addresses, wherein P is a preconfigured value, e.g. 90 (percent).

Notably, the plurality of IP addresses provided to the control device 6 may grow as the earlier discovered probes 2 send collected IP addresses to the control device 6. Thus, in one embodiment, the method provides identifying routable IP addresses in steps 121 and 122, using them for discovery of test devices in the network (steps 124, 126, 128, and 130), collecting IP addresses from packets passing through the discovered test devices, providing those IP addresses to the control device 6 (step 120) and using the collected IP addresses so as to identify additional routable IP addresses (steps 121 and 122), and so on, recursively.

During the request sending step 121, a frequency of sending the first packets is below a predefined threshold so as to avoid disturbing the traffic in the network 100. The frequency of sending first packets may be limited by specifying intervals between first pockets e.g. to be in the range of 30 to 3600 seconds (configurable by the user), preferably in the range of 60 to 300 seconds. Alternatively, the groups of surveyed IP addresses may be separated in time by a configurable rest time, e.g. in the range of 60 to 300 second. By way of example, not more than 1000 packets are sent in 1 second followed by the rest time of 5 seconds. That is why the operation may take a few hours to complete. The max time-length of the survey process should be configurable through the SM GUI. The intervals between the first packets may be randomized, however the average frequency should be sufficiently low, e.g. not greater than 1000 packets per second.

An IP address is recognized as reachable or routable from the control device 6 when a first packet sent from the control device 6 to the particular IP address is received at that IP address and a response from the IP address is received at the control device 6, the response receiving step 122. The fact of receiving a response to the first packet, or "positive" content of the response packet in accordance to the protocol used, identifies the IP address as a routable IP address. If no response is received, or a response is received but indicates that the IP address has not been reached, the IP address may be assumed to be non-routable or unreachable.

By way of example, if the control device 6 sends an ICMP echo request message to the IP address and receives an ICMP echo response message that proves routability of the IP address. The routable IP addresses are stored in the memory of the control device 6 for later use in re-discovery of test probes.

After an IP address within the network 100 is identified as a routable address, the control device 6 sends a discovery packet in the direction of that routable IP address in a sending discovery packets step 124. In other words, the routable address may be used in the destination address field of the discovery packet.

Ideally, for a total survey of the specified portion of the network, e.g. a subnet specified by a range of addresses, all the routable IP addresses should be used for sending discovery packets. However, in operation, few reachable IP addresses within the plurality of routable addresses may be left out and no discovery packet sent using those addresses. Nevertheless, substantially all the routable addresses, i.e. not less than a predefined portion of the routable addresses, i.e. at least 90% of the addresses, should be used as destination addresses in discovery packets sent by the test control device 6.

Although the destination IP addresses in the discovery packets are the routable IP addresses of the nodes on the network 100, the discovery packets are intended for test devices 2 which may be present within the paths between the control device 6 and a particular routable IP address. The probes 2 are configured to analyze all the packets passing through them. When a probe 2 identifies a predefined hello pattern in a predefined field of the IP packet, the probe responds to the control device 6 with an identification packet which includes the identification number (ID) of this particular test device 2.

The probe 2 may use the address in the source IP address field of the received discovery packet as the destination address in the identification packet. The destination IP address of the test device identification packet may be the address of the control device 6 known to the probe 2, e.g. from the payload of the discovery packet. The identification packet may include the routable IP address used as the destination address of the discovery packet, either in the source address field or in the payload. The identification packet may include IP addresses seen at this location in the network. The probe 2 may be configured to terminate the discovery packet or send it further according to its destination address so that other test device 2 may be discovered.

The information packets sent by the probes 2 in response to the discovery packets are received at the control device 6, in a receiving information packets step 126. In an information extracting step 128, the control device 6 extracts test-device information about one of the plurality of test devices from each of the received information packets.

In the information storage step 130, the information about the plurality of test devices is stored in memory of the control device 6, so as to associate, for each of the plurality of test devices, the test-device information with at least one of the plurality of routable IP addresses which was used to reach the particular test device 2. Preferably, the information about the plurality of test devices is stored in a non-volatile memory to be available after restart of the control device 6.

After the initial discovery, when the test system is in operation, there may be a need for a re-discovery of the test devices. For example, a test device may be "lost" because of load balancing or changes in the network 100. The re-discovery would reuse the list of routable IP addresses previously obtained while identifying a plurality of routable IP addresses within the plurality of the IP addresses, i.e. during the request sending step 121 and response receiving step 122, whereas the steps related to obtaining the information about the plurality of test devices (124, 126, and 128) and storing the information 130, would be repeated as shown by an arrow 132 in FIG. 3.

The method disclosed with reference to FIG. 3 is executed by the control device 6, and may be implemented in software stored in a non-transitory computer-readable medium, e.g. of the control device 6. The program (software), when executed by at least one processor, causes the at least one processor to perform the method described herein.

The steps shown in FIG. 3 may be executed concurrently. By way of example, an echo packet may be sent to an IP address IP1; then, after a response to the first packet is received from IP1, a discovery packet may be sent to IP1; when an information packet is received, the information about a test device may be stored and associated with IP1. Then, possibly after a delay, an echo packet may be sent to another IP address IP2, etc.

Figure 4:
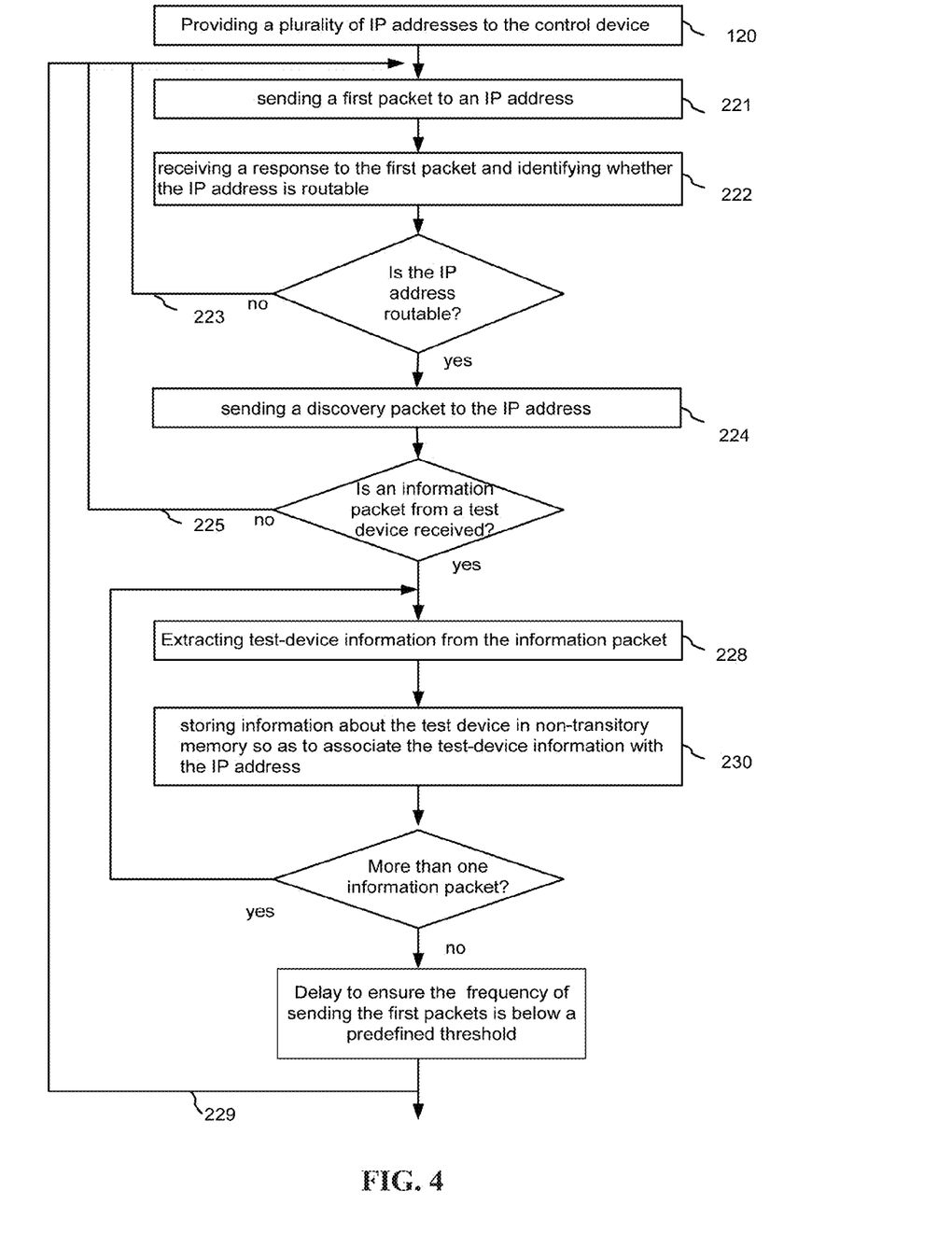
FIG. 4 is a flow chart of a method of collecting information about a plurality of test devices within a network.

FIG. 4 is a flow-chart of an embodiment of the method discussed above with reference to FIG. 3, wherein the control device 6 performs the aforedescribed operations on the per-address basis. For a selected IP address, the control device performs a step of sending a first packet to an IP address 221. If no response is received, another IP address is selected and the sending step 221 is repeated possibly after a delay. These and other delays between the steps of the method may have preconfigured or random lengths. After sending the first packet, in a response receiving step 222, the control device 6 identifies whether the IP address is routable. If not, another IP address is selected and the sending step 221 is repeated as indicated by an arrow 223, possibly after a delay. If the IP address is routable, in a discovery step 224, the control device 6 sends a discovery packet to the IP address. If an information packet is received after sending the discovery packet, in an information extracting step 228, the control device 6 extracts test-device information, e.g. the ID of the test device, from the information packets. In an information storing step 230, the test-device information extracted from the information packet is stored in memory so as to be associated with the IP address used for sending the discovery packet. If more than one information packet is received in response to the discovery packet, i.e. if more than one test device is discovered, the steps 228 and 230 are performed several times. After a delay, another IP address is chosen and the cycle repeats as indicated by an arrow 229.

FIG. 4 illustrates in more detail one embodiment of the method disclosed with reference to FIG. 3, wherein the request sending step 121 comprises a plurality of sending steps 221 performed for IP addresses provided to the control device 6 in the network identifying step 120; the response receiving step 122 comprises a plurality of response receiving steps 222; the sending discovery packets step 124 comprises a plurality of discovery steps 224; the information extracting step 128 comprises a plurality of information extracting steps 228; and, the information storage step 130 comprises a plurality of information storing steps 230.

In the embodiment illustrated in FIG. 4, it is not necessary to store the routable IP addresses in the control device 6. However, it is still preferable to store the routable IP addresses, e.g. adding them one by one to a list of routable IP addresses stored in the memory of the control device 6 each time when the response receiving step 222 results in identifying a routable address. The list of routable IP addresses may be used later for re-discovery of the test probes 2.

In one embodiment of the method, the survey of IP addresses so as to identify a plurality of routable IP addresses within the plurality of the IP addresses, i.e. steps 121 and 122 in FIG. 3, is performed before obtaining and storing the information about the plurality of test devices (steps 124, 126, 128, and 130 in FIG. 3). This embodiment of the method relies on storing the plurality of routable addresses in the control device 6. The re-discovery procedure reuses the list of will routable addresses and repeats the steps performed for obtaining and storing the information about the plurality of test devices.

The plurality of routable IP addresses may be stored in the form of a list; however, other types of data collection constructs may be used, e.g. a tree or map of addresses. A list of all IP addresses in the network 100 with indication whether an address is routable may be useful for a VPN.

The communication network 100 may be any type of packet network, currently known or later developed, including the Internet, WAN, LAN, MPLS networks, telephony network, wireless network, optical network, and/or any combination of the foregoing. Preferably, the communication network 100 is a packet-switched network or any type of network that uses addressing for packet, cell or frame delivery. Such networks include but are not limited to Asynchronous Transfer Mode (ATM) networks, Frame Relay networks, Hybrid fiber-coaxial (HFC) networks, and Synchronous Optical Network/Synchronous Digital Hierarchy (SONET/SDH) networks. The current design is for packet based networks, but the method may be useful in other kinds of networks. Accordingly, the term "packet" should be understood as including conventional packets, such as IP and Ethernet packets, as well as cells and frames. Accordingly, the method of collecting information about a plurality of test devices connected in the network may be implemented for various types of packets.

The test devices 2 may be passive, inline intelligent packet director (IPD) transceivers or optical Small Form-factor Pluggable (SFP) transceivers. An SFProbe is an inline device, which does not require a separate network connection to deliver captured packets. The test devices 2 may take advantage of inter-packet gaps and unused bandwidth in a network when messages or test results have to be sent, as disclosed in U.S. Pat. No. 7,948,974 issued May 24, 2011 to Ilnicki et al, and U.S. Pat. No. 8,009,557 issued Aug. 30, 2011 to Curran-Gray et al., which are incorporated herein by reference. When an idle period is detected, a result packet is inserted into the network for routing back to the system and subsequently the destination application or tools. Accordingly, no network packets are dropped while passing through the test devices 2.

The test device 2 may examine packets at full-duplex line-rate speeds, so as to identify packets of interest that are then copied from the network, accurately time-stamped, encapsulated into a results packet, and inserted back into the network for routing to the targeted application—all without causing loss or disruption to the original flows, as disclosed for example in U.S. Pat. No. 7,894,356, issued Feb. 22, 2011 in the name of Mottishaw et al., U.S. Pat. No. 8,661,292 issued Feb. 25, 2014 in the name of Stevens et al., U.S. Pat. No. 8,654,790 in the name of Haver et al., and U.S. Patent Application Pub. No. 20110305149 in the name of Scott et al., all of which are incorporated herein by reference.

In one embodiment, every test device 2 incorporates a protocol header parser (PHP) that automatically identifies most major protocols over virtually any network encapsulation for data and packet acquisition. The PHP works in conjunction with four programmable filter banks, which may be activated in every test device 2. Each filter bank may hold up to eight bidirectional independent filter patterns that define the network traffic to be captured and forwarded. Users can set up simple or complex filters using the GUI 5 from the System Manager 4, as disclosed for example in U.S. Pat. No. 7,760,663 issued Jul. 20, 2010 to Ilnicki et al, which is incorporated herein by reference.

The control device 6 may be a general purpose or specialized computer, comprising one or more processors and a memory coupled to the one or more processors with instructions executable by the processors so as to perform the method disclosed herein.

The control device 6 may be a Packet Routing Engine (PRE) 6 which provides scalable management and control of the test devices 2 across the network. By way of example, each PRE 6 can manage and control up to 500 SFProbes 2; however, future PRE 6 will be able to support thousands of SFProbes 2.

The system manager 4 may send a command to the PRE 6 to initiate discovery of test devices within a specified network. Alternatively, e.g. in the absence of the system manager device, the discovery may be initiated e.g. through a command line interface at the PRE 6. The PRE 6 also may receive the instructions from a web based interface 5.

In one embodiment, a system for monitoring packet traffic as shown in FIG. 1 may include multiple control devices (PRE 6) managed by the System Manager 4, wherein each PRE 6 sends commands to and receive test data from multiple test devices.

Each PRE 6 may maintain network connections, state, time synchronization, encryption, and discovery, and they route captured result packets for the test devices 2 in their domain. Decoupling the functions of the PRE 6 from those of a central System Manager 4 enables the system scale to sizes never before conceived of for packet-access solutions. The PREs 6 may be synchronized with a global time source, such as a global positioning system (GPS), network time protocol (NTP), IEEE 1588 master clock, as disclosed for example in U.S. Pat. No. 7,573,914 issued Aug. 11, 2009, and U.S. Pat. No. 7,689,854 issued Mar. 30, 2010 both in the name of Ilnicki et al., which are incorporated herein by reference.

The System Manager 4 may provide user management and system access e.g. through a web-based graphical user interface (GUI) 5 that users can access through any compliant browser. The intuitive user interface of the System Manager 4 enables quick and easy access to the features, functionality, and management of the entire system. The System Manager 4 may control several Packet Routing Engines (PRE) 6.

A Packet Delivery Gateway (PDG) 8 may enable one or more applications, e.g. analysis application 9a or analysis probe 9b, to connect to the system and receive time-aligned packets, as if they were locally connected to a monitor port or tap at the remote location. The PDG uses captured timestamps and sequence numbers from the test devices 2 to play aggregated streams out a monitor port. The streams maintain proper sequencing and inter-packet timing that represents what the packets experienced while passing through the remote network port. PDG's 8 can feed packets to any device or application that would normally connect to a tap, SPAN port, aggregator, mirror port or equivalent technology. The PDG 8 enables applications to reside in central locations instead of remote locations, where it may not be economically practical to deploy. Accordingly, the PDG 8 provides the ability to utilize legacy and even future probes and test systems with the PacketPortal system.

A virtual network interface card 10 (VNIC) is a software component that emulates a physical network interface card (NIC) driver and enables any Ethernet-based software application to receive feeds from a PacketPortal system via a NIC interface. The VNIC receives Packet Portal feeds, removes the transport headers and metadata to reveal the network traffic, and retransmits the original packets to the PC's network stack. The traffic is replayed using the original capture timestamps and sequence numbers to accurately represent the traffic as it was captured at the remote element. The replay may be configured to output on a specific transmission control protocol (TCP) or user datagram protocol (UDP) port from the PRE 6 to the VNIC 10. The VNIC 10 can also read captured network data files in the packet capture (PCAP) format and replay them similarly to how live traffic is processed through the PacketPortal system.

The control device 6 (e.g. a PRE) may use a set of IP addresses provided by the customer to conduct the auto-discovery and ownership of Probes, and the ongoing communication with the Probes. However, the customer in most cases cannot guarantee that all the IP addresses provided are routable from the test device to the Probes. A command sent from the PRE to a Probe using a non-routable IP cannot reach the Probe. In addition when the currently used IP address can no longer be used (e.g. out of commission), the PRE needs to use a different routable IP address.

The method disclosed herein provides a mechanism to collect and validate routable IP addresses from the original set of IP addresses which may be provided by the customer, acquired from the network, and/or dynamically collected by the test devices 2 and sent to the control device 6. With reference to FIG. 3, the latter embodiment comprises performing the step of providing IP addresses 120 concurrently with other steps in the flow-chart.

The test device 2 is connected in the network 100 for capturing traffic packets passing therethrough, or at least portions of the packets, e.g. headers. Herein the terms "traffic packets" and "portions of traffic packets" are used interchangeably and encompass any portion having a non-zero length, up to and including an entire packet. Time intervals separating the traffic packets may be non-periodic time intervals. The test device 2 may capture all packets passing therethrough or may apply a filter so as to get only particular packets e.g. selected by a byte pattern, destination or a protocol.

The test device 2 performs encapsulating the captured traffic packets so as to form encapsulated packets. The encapsulation is necessary in order to preserve the captured data and transport it over a network to a different location without changes such as changes to the destination address field which happen when a packet is conventionally sent over a network without encapsulation.

The test device 2 may be an eavesdropping device inserted inline between one or more elements capable of communicating information over a communication network. The test device 2 may use various time synchronization protocols such as Network Time Protocol (NTP) or IEEE 1588, or any other time synchronization method such as GPS, to synchronize time across a plurality of eavesdropping devices. The test device 2 may contain information needed to communicate packets on an inline sub-channel. The test device 2 inspects data contained in network packets passing through it. A configurable protocol header parser may be used in the test device 2 to identify and inspect known and unknown protocol headers. When the test device 2 identifies a packet meeting particular criteria, the packet or its portion may be replicated, time stamped and stored in an elastic buffer. The test device 2 constructs an encapsulated packet and sends it to the control device 6. The test device 2 may use techniques described in U.S. Pat. No. 7,336,673 incorporated herein by reference to form a low bandwidth channel by inserting packets into a high bandwidth packet stream.

Figure 5:
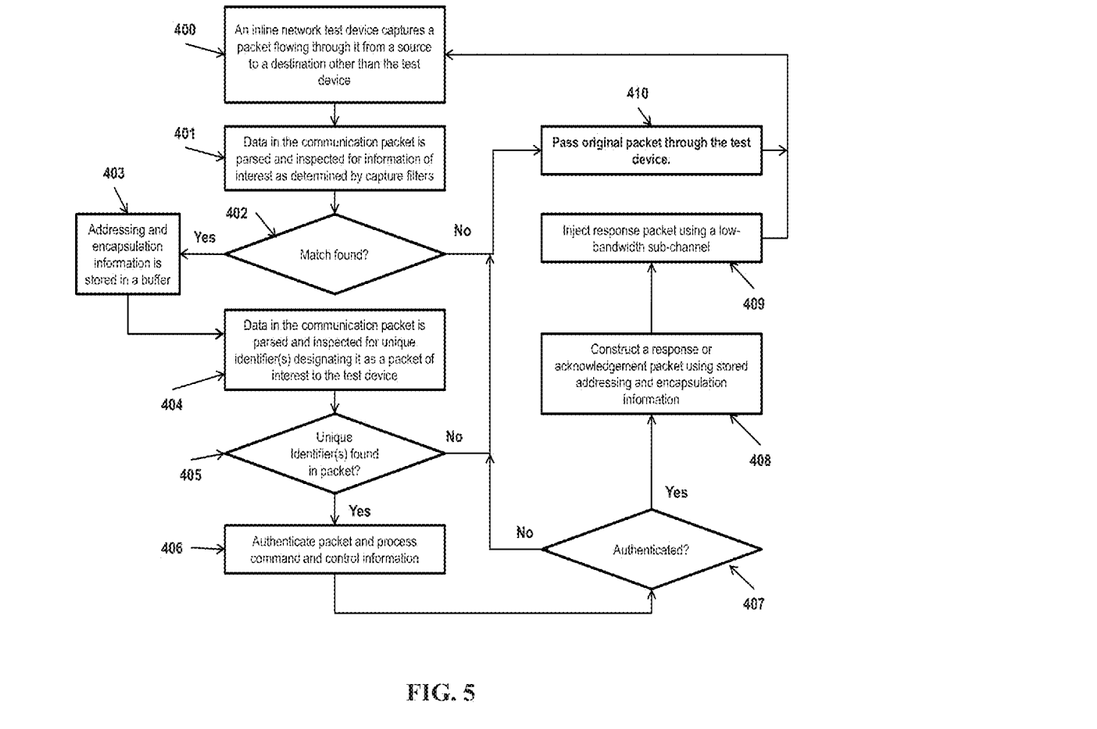
FIG. 5 is a flow chart of the algorithm that may be performed at a test device.

FIG. 5 is a partial flow chart of the algorithm that may be performed at the test device 2. In an operational block 400, a test device 2 captures a packet 103 communicated over a communication network 100; the source address of the captured packet identifies the source device 101, and the destination address of the packet identifies the destination device 102; both devices are different from the test device 2. In operational block 401, the test device scans packet's 103 headers and payload using a packet header parser for network addresses and encapsulations needed to communicate on network 100. If addressing is not found 402, packet 103 is passed through test device 2 back onto network 100. In operational block 403, the test device 2 stores discovered network addresses and encapsulations in a buffer. In operational block 404, the test device 2 scans the captured packet's 103 payload searching for predefined authentication patterns. In operational block 404, the test device 2 determines whether any of the authentication patterns is found in the packet's payload. If none of the authentication patterns are found 405, operation advances and the packet 103 is passed through the test device 2 back onto network 100 to the destination address of the packet 103 without any changes made to the packet 103. In operational block 406 the packet 103 is authenticated and determined if a "hello" pattern or an ID for the particular test device 2 is present. A command parser extracts any commands and information of interest to test device 2 if authenticated 407. In operation block 408, the test device uses the captured encapsulation and addressing information captured in block 403 and constructs a response/acknowledgement packet, such as an information packet with a test device ID, to the source 101, which is presumed to be the control device 6. The response/acknowledgement packet is held in a FIFO buffer while it is waiting to be injected during an idle frame using a sub-channel in operational block 409. At the end of the operation the test device returns to operational block 400 to capture the next packet.

Figure 6:
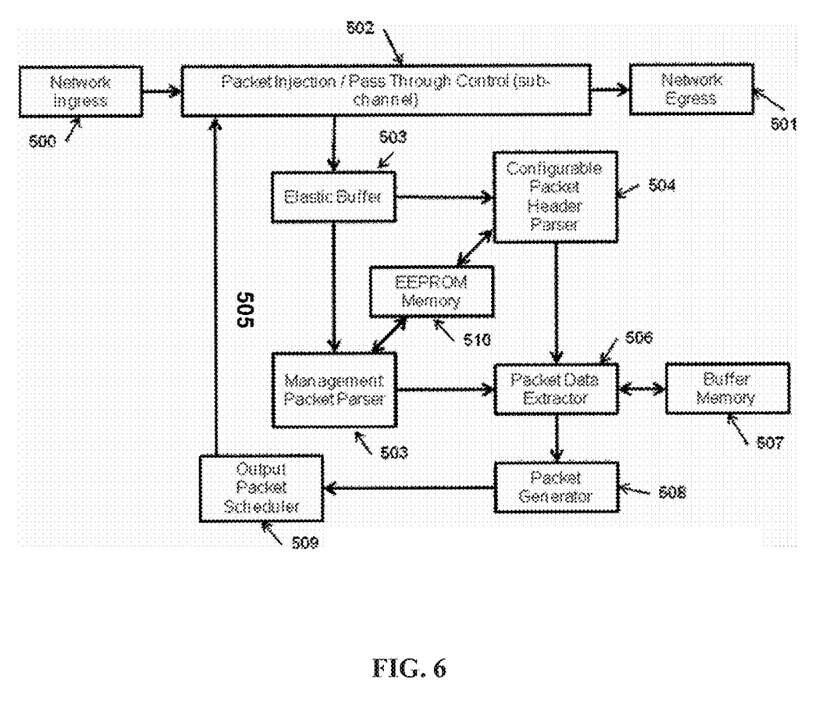
FIG. 6 is a schematic diagram of a test device.

FIG. 6 is a schematic diagram of a test device 2. A functional block 500 shows an ingress point into the test device 2 from a source 101. A functional block 501 shows an egress point from the test device to a destination 102. The ingress 500 and egress 501 can be any electrical, optical, wireless or other known or unknown method used for communicating information over the communication network 100. A functional block 502 is a packet injection pass through control commonly referred to as a sub-channel. The sub-channel 502 is capable of receiving and injection packets on the network 100. The sub-channel 502 receives a packets 103 into an elastic buffer 503 as they are received. The packets in buffer 503 are extracted from the buffer 503 by a configurable packet header parser 504 and a management packet parser 505. The packet header parser 504 inspects the packet 103 and identifies key header and payload information locations for a packet data extractor 506. These can include network addresses such as media access control (MAC) or Internet Protocol (IP) addresses or other layer 2, layer 3 or and other OSI layers that enable communications to be carried of known or unknown networks. The management packet parser 505 examines the packet 103 for authentication patters, IDs, commands and any other information deemed of interest for the test device 2. The authentication patterns including IDs, commands, etc. are stored in a memory component 510 of the test device 2. The memory component 510 may be any non-volatile memory such as an Electrically Erasable Programmable Read-Only Memory EEPORM, flash memory, Ferroelectric RAM, application-specific integrated circuit (ASIC), any writable memory known and unknown or combination thereof. Any important information is flagged for extraction or processed. The packet data extractor 506 takes information of interest identified by the management packet parser 505 and/or the packet header parser 504 and extracts the information of interest into a buffer memory 507. Information of interest can be protocol headers, network addresses, header fields, data strings, counts, full packets or any combination of data present in packet 103. The memory component 507 can be a combination of RAM, ROM or other memory and storage technology known and unknown today In particular, the memory component 507 has the set of network addresses collected from the packets forwarded by the test device 2 onto the network 100 and the information of interest collected by the packet data extractor 506.

A packet generator 508 takes data from the buffer memory 507 and creates response or acknowledgement packets for sending to the source 101 or destination 102 or any other location as determined at the test device 2 and based on the data or instructions learned while processing/parsing the packet 103. Once packet the generator 508 constructs a valid packet, a functional block 509 acts as an output buffer/scheduler for the sub-channel 502. When an idle period is determined, the sub-channel 502 receives the response/acknowledgement packet from the scheduler 509 and inserts it in the network 100 in accordance with the addressing contained in the packet.

The components of the test device may be implemented in a combination of software and hardware such as an Application Specific Integrated Circuit (ASIC), Field programmable Gate Array (FPGA), network processor, system on a chip such as an FPGA with integrated ARM or micro processor, Complex Programmable Logic Device (CPLD), Erasable programmable logic device (EPLD), Simple programmable logic device (SPLD), or macrocell array.

The unaddressed device 2 contains a unique identifier and inspects all packets passing through the device and, with a programmable packet header parser that is aware of traditional packet headers and may be configured to learn new header types, learns the encapsulation of the network needed for communication from a Hello discovery packet received from a control element 6. The method disclosed herein may use IP packets for verifying the routability of IP addresses on the network 100, and for sending the discovery packets. The discovery packet may be a UDP packet with a predefined "hello" pattern in the UDP payload field. If a packet passing through the device 2 has a mark that it is a discovery/communications packet, it is responded to with the device's ID. In particular, the test device 2 has the "hello" pattern and other predefined patterns stored therein. The unaddressed device 2 may collect candidate network addresses that can be used to communicate with it, e.g. destination IP and MAC addresses of every packet passing through the device. If the method of collecting information about a plurality of test devices as discloses herein works with MAC addresses, i.e. surveys routability of MAC address on the network and then sends discovery packets of a predefined format to the routable MAC address, the method also may update the list of addresses to be surveyed with the MAC addresses collected by the probes 2.

Figure 7:
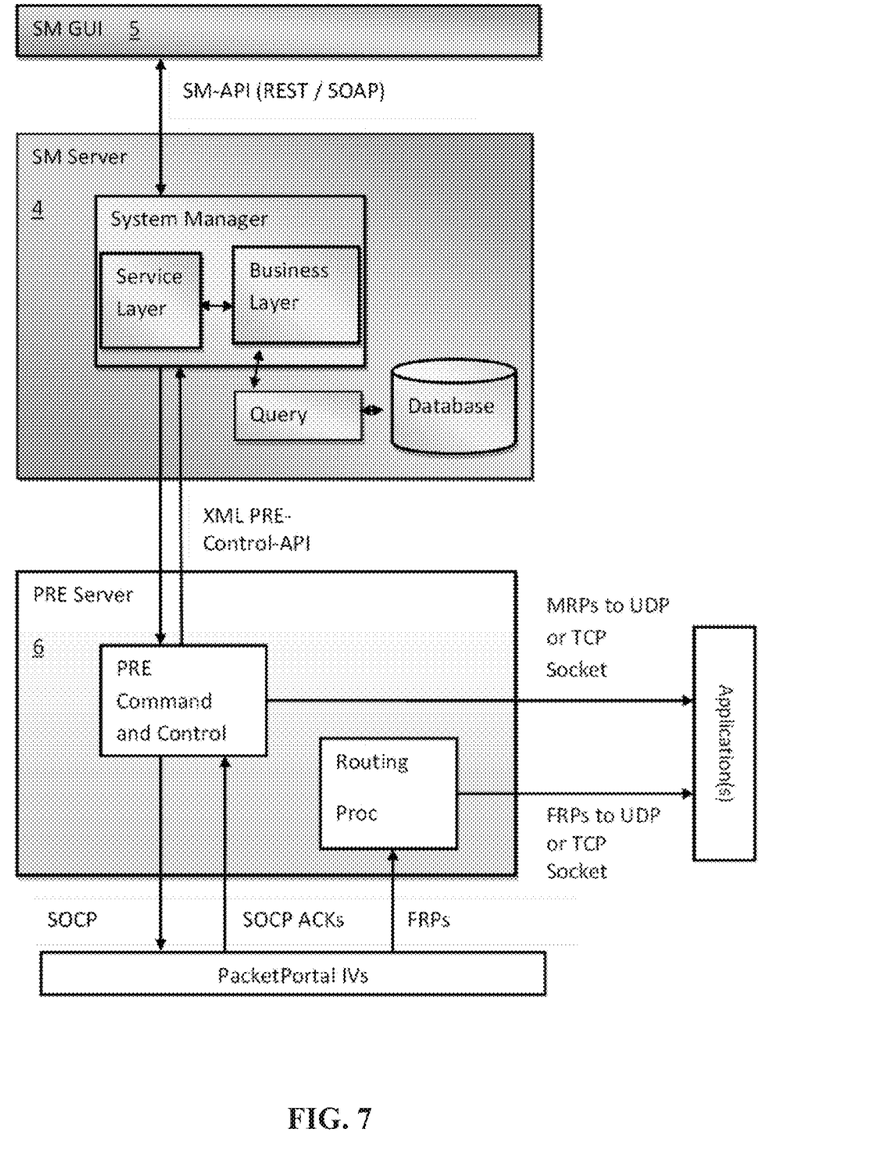
FIG. 7 is a schematic diagram of a network monitoring system.

FIG. 7 is a schematic diagram of a network monitoring system which may employ the method of collecting information about the test devices 2. The control device 6 sends out discovery packets to locate unaddressed devices 2 in the network. For each discovered test device 2, the control device 6 maintains a set of downstream network addresses which belong to downstream devices such that packets originated at the control device 6 would travel across the unaddressed device 2 if the packets have a destination address one from the set of downstream IP devices. The control element 6 creates and transmits control and management packets (SOCP packets) intended to the unaddressed test device 2 and having a destination address downstream of the unaddressed network device 2. The SOCP packets may contain a unique identifier of the unaddressed network device 2 and other authentication pattern (s), a sequence number; the packets may be encrypted.

In operation, the Command and control element 6 chooses or provided with a network address or subnet where an unaddressed network device may reside to be discovered. A discovery packet is created and directed to the target network address. The "undiscovered" unaddressed network element 2 inspects every packet for the discovery packet identifiers. The unaddressed network device collects candidate network addresses for communication with the control device 6. By way of example, the device may be instructed to look at all frames on the link and perform matched filter-logic over each packet.

The unaddressed network device 2 learns the network encapsulation of a detected discovery packet by inspecting the headers preceding the command and control information. This network encapsulation is then stored in the test device for later use to transmit packets on the network 100. When a discovery packet is detected, it is parsed to see if a response should be crafted. When a discovery packet is detected for response, an SOCP packet is created; the information packet contains the learned encapsulation, and may contain one or more candidate network addresses for use by the control device 6 when communication with the unaddressed device 2. The packet may have a source address one from the set of collected network addresses, and a destination address which is the same as the source address of the discovery packet. When the command and control element 6 receives the discovery response packet (test device identification packet), network addresses and other command and control data are extracted, an address table for communications back to the unaddressed device is created or updated.

When the customer provides a few large subnets for discovery and ER (Enhanced Retry) operations, many of the IP addresses in the subnets may not be routable. Moreover, in the case of Subscriber VLAN hashing, a large subnet may be further divided into smaller subnets with unequal sizes which in turn correspond to different VLANs. In this case the control device 6 needs to obtain a subset of IPs (belonging to different VLANs) which can cause Smart Optics Command Packets (SOCP) commands to be sent down all the links in a LAG (Link Aggregation Group) with more or less equal chances.

The Packet Portal SFProbes watch all packet traffic passing through them, and are constantly looking at the IP addresses in these packets. When a probe sees a new IP address, the probe holds the IP address in memory. The next time the PRE server sends a command (SOCP) to the SFProbe, the SFProbe includes the new IP address in the ACKnowledgement packet it sends back to the PRE server in response to the SOCP. The PRE builds and maintains a list of these IP addresses over time. However, this only means that the SFProbe sees the addresses, it does not guarantee that any or all of the addresses are routable from the PRE server to the SFProbe. Today if the PRE loses contact with an SFProbe, it starts trying the addresses in this list.

The enhance retry technique (ER) is a method for the control device 6 to maintain communication with a test device 2 (e.g. an SFProbe) that is plugged into a LAG, since LAGs provide special challenges due to load balancing. US2011/0283140 incorporated herein by reference covers communications between a PRE and an SFProbe. Since this communication uses 'borrowed' IP addresses of other devices in the network, the IP address being borrowed could become unroutable in the network. By way of example, it could be an IP address of a laptop computer that is no longer on the network. When this happens, the PRE will 'retry' communications to the SFProbe using other IP addresses it has collected as possible backup addresses. The ER method uses more than one 'borrowed' IP address from the list of collected routable IP addresses, and may send multiple copies of the same SOCP packet to increase the chance of getting the SOCP packet to the desired SFProbe sitting inside the LAG.

The ER mechanism is designed to handle Load Rebalance (aka Dynamic Load Balance or Auto Load Balance) in a LAG. When Load Rebalance happens, the original hash algorithm is overwritten and SOCP commands from the control device 6 intended to the test devices 2 can be sent down a different link in a LAG in an unpredictable fashion. In result, a test device 2 may be "lost" by the control device 6, i.e. packets sent from the control device 6 to the test device 2 would receive no response because a path to the IP address previously used for communication with this particular probe 2 has been changed and now does not include the link where the probe 2 is connected. Instead of multiple retries with the same IP address, the ER method uses other routable IP addresses associated with this probe, as provided by step 130 of the method disclosed herein.

ER requires a set of 'borrowed' IP addresses that can be used instead of a single one. The survey technique disclosed herein ensures that the set of 'borrowed' addresses are routable addresses between the PR and the SFProbe(s) in the LAG in order to improve the performance of ER.

Here is a hypothetical case of uneven VLAN distribution: Consider the case that a Service Provider assigns a large subnet through a LAG, say 10.120.76.0/22, to a number of enterprises and individual customer homes. In addition, this subnet is further divided into 3 large enterprise subnets (10.120.77.0/24, 10.120.78.0/24 and 10.120.79.0/24) and 64 small residential customer subnets carved out of subnet 10.120.76.0/24 (i.e. 10.120.76.0, 10.120.76.4, 10.120.76.8, 10.120.76.12, 10.120.76.16, . . . 10.120.76.252). To make things worse, some of the enterprise subnets can be further divided into smaller subnets of unequal sizes. For example, the 10.120.77.0/24 subnet can be further divided into a mixture of smaller company and individual customer subnets. Depending on how subnets are assigned to VLANs, an even distribution of egress IPs may not result in even distribution of VLANs, resulting in unequal chances of packets retransmitted by the ER mechanism to be rebalanced more or less equally down all the links in a LAG.

If the customer provides a large set of IP addresses as mentioned above, the Egress Survey operation should be initiated.

The control device 6 conducts the survey operation in the background, without affecting customer traffic. The control device 6 walks through the large subnets provided by the customer, using small groups of IP addresses to send Discovery messages trying to find unmanaged probes in the network 100. The customer may supply many IP address ranges which total up to hundreds or thousands of individual IP address that in total represent a pool of IP addresses that could potentially be 'borrowed' for the communication between a control device 6 and a test device 2. The survey would process or 'survey' smaller chunks at a time. To minimize customer traffic interruption, the survey may inject the packets in small groups at a more slowly timed pace, e.g. at than just blasting the packets as fast as possible. In practice, the number of packets injected are configurable, so that they can be adjusted during testing and then settled upon with a good default value. The configuration then enables adjustments for specific customer networks in case they have unique situations, where the default does not work well. The configuration for 'max number of discover hello packets to send in 60 seconds' would be 1 to 1 Million per minute, with a reasonable default being around 1K-32K packets per minute. In the end, the lower the rate used, the longer the process will take, but the process should work in any case.

The control device 6 then collects probe IDs and the source IP addresses contained in any Discovery Acknowledge, e.g. Hello Ack, Packets received in response to the Discovery packets. After a considerable number (e.g. more than 35, this number should be configurable through the SM GUI or PREConfig) of IP addresses have been collected for each discovered Probe, the process is completed. The control device 6 can then use these collected IP addresses as egress IP addresses for future discovery/activation and retry operations.

The control device 6 only periodically sends survey Discovery Hello SOCP packets to avoid flooding the customer network with Hello, Hello Ack and ICMP Unreachable packets. For example once every 30 to 3600 seconds (configurable by the user), preferably once every 60 to 300 seconds would be a more typical range. Alternatively, the groups of IP addresses surveyed are separated in time by a configurable rest time of 60 to 300 seconds. That is why the operation may take a few hours to complete. The max time-length of the survey process should be configurable through the SM GUI.

Internet control message protocol (ICMP) is an industry standard packet that may be generated by network devices as a side-effect of our Discovery Hello SOCP packets in the network. ICMP is chiefly used by the operating systems of networked computers to send error messages indicating, for example, that a requested service is not available or that a host or router could not be reached. The discovery packets sent in accordance with our method can cause some devices to generate ICMP packets; we therefore want to throttle the sending pace of these over time to avoid causing a 'storm' of ICMP packets in the network.

The survey results, comprising the plurality of routable IP addresses and information about the test devices 2 wherein information for each particular test device is associated with one or more routable IP addresses which may be used to reach the test device may be stored in the RAM of the control device 2. Preferably, the survey results are stored in a persistent storage, such as an external device or a non-volatile memory of the control device 6, e.g. on a hard disk on the control device 2, or in any other non-volatile storage. When the control device 6 is re-launched, the previously surveyed results can be retrieved and used immediately.

In the description above, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

We claim:
1. A method comprising:
   sending first packets to a plurality of network addresses by using a frequency that is below a predefined threshold;
   receiving responses to the first packets from one or more of the plurality of network addresses;
   identifying that the one or more of the plurality of network addresses are routable network addresses based on receiving the responses from the one or more of the plurality of network addresses;
   sending discovery packets by using the routable network addresses as destination addresses in the discovery packets;

receiving information packets from a plurality of test devices, in a network, as responses to the discovery packets;

identifying one or more additional routable network addresses based on one or more collected network addresses from the information packets; and using the one or more additional routable network addresses for discovery of one or more other test devices in the network.

2. The method of claim 1, wherein the plurality of test devices are unaddressed devices.

3. The method of claim 1, wherein the first packets are echo request packets.

4. The method of claim 1, wherein the plurality of network addresses is a range of IP addresses.

5. The method of claim 1, wherein the network is a Virtual Private Network (VPN).

6. The method of claim 1, wherein the routable network addresses are stored in a control device.

7. The method of claim 1, wherein the plurality of network addresses comprise network addresses collected at the plurality of test devices.

8. The method of claim 1, wherein the routable network addresses and the one or more collected network addresses are stored in a non-volatile memory.

9. An apparatus comprising:
one or more processors configured to:
send first packets to a plurality of network addresses by using a frequency that is below a predefined threshold;
receive responses to the first packets from one or more of the plurality of network addresses;
identify that the one or more of the plurality of network addresses are a plurality of routable network addresses based on receiving the responses from the one or more of the plurality of network addresses;
send discovery packets by using the plurality of routable network addresses as destination addresses in the discovery packets;
receive information packets from a plurality of test devices as responses to the discovery packets;
identify one or more additional routable network addresses based on one or more collected network addresses from the information packets; and
use the one or more additional routable network addresses for discovery of one or more other test devices.

10. The apparatus of claim 9, wherein the predefined threshold specifies intervals between the first packets.

11. The apparatus of claim 9, wherein the predefined threshold specifies a quantity of packets sent in a particular period of time.

12. The apparatus of claim 9, wherein the one or more processors are further configured to:
obtain the plurality of network addresses by querying a customer device that manages address pools.

13. The apparatus of claim 9, wherein first packets include Internet Control Message Protocol (ICMP) echo protocol packets.

14. The apparatus of claim 9, wherein intervals between the first packets are randomized.

15. A non-transitory computer-readable medium storing instructions, the instructions comprising:
one or more instructions that, when executed by at least one processor, cause the at least one processor to:
send first packets to a plurality of network addresses by using a frequency that is below a predefined threshold;
receive responses to the first packets from one or more of the plurality of network addresses;
identify that the one or more of the plurality of network addresses are a plurality of routable network addresses based on receiving the responses from the one or more of the plurality of network addresses;
send discovery packets by using the plurality of routable network addresses as destination addresses in the discovery packets;
receive information packets from a plurality of test devices as responses to the discovery packets;
identify one or more additional routable network addresses based on one or more collected network addresses from the information packets; and
use the one or more additional routable network addresses for discovery of one or more other test devices.

16. The non-transitory computer-readable medium of claim 15, wherein the predefined threshold specifies a quantity of packets sent in a particular period of time.

17. The non-transitory computer-readable medium of claim 15, wherein the first packets include ping messages.

18. The non-transitory computer-readable medium of claim 15, wherein the instructions further comprise:
one or more instructions that, when executed by the at least one processor, cause the at least one processor to:
receive the plurality of network addresses in a form of an IP address list.

19. The non-transitory computer-readable medium of claim 15, wherein intervals between the first packets are randomized.

20. The non-transitory computer-readable medium of claim 15, wherein the first packets include Internet Control Message Protocol (ICMP) echo protocol packets.

* * * * *